United States Patent Office 3,063,549
Patented Nov. 13, 1962

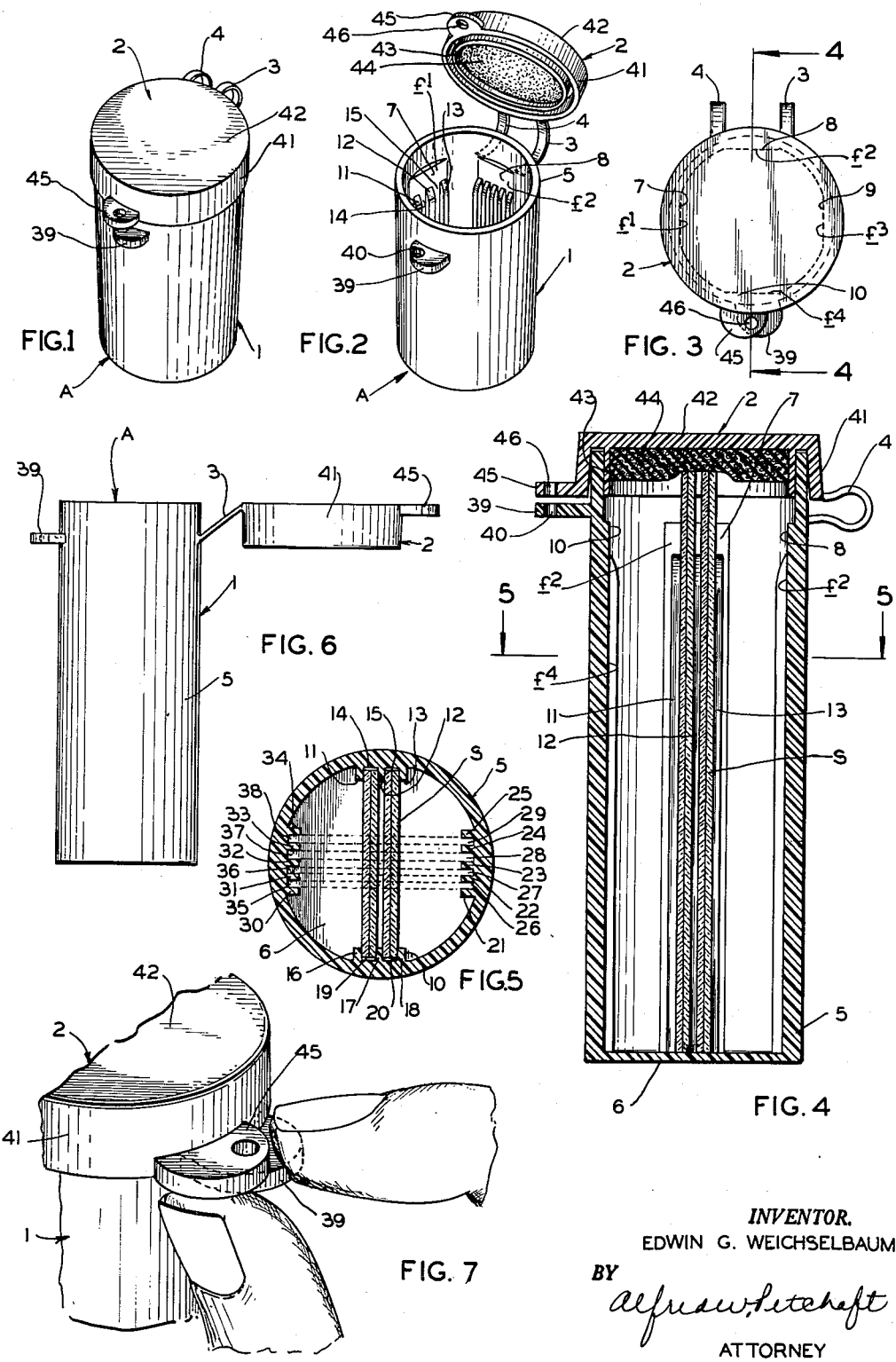

3,063,549
PROTECTIVE CONTAINERS FOR HOLDING MICROSCOPE SLIDES AND SIMILAR FRAGILE DEVICES
Edwin G. Weichselbaum, Normandy, Mo., assignor, by mesne assignments, to Brunswick Corporation, Chicago, Ill., a corporation of Delaware
Filed Aug. 14, 1961, Ser. No. 131,297
4 Claims. (Cl. 206—1)

This invention relates in general to certain new and useful improvements in protective containers for holding microscope slides and similar fragile devices.

In carrying out various kinds of biological tests and particularly in connection with medical diagnosis, it is often necessary to prepare one or more microscope slides, and send such slide or slides to a laboratory for examination. In some instances, the specimen is mounted directly upon a single slide and is left uncovered. In other instances, the specimen is placed upon the surface of one glass plate and covered with a second glass plate of identical thickness and peripheral shape, so that the specimen is, in effect, enclosed between two overlying glass plates forming a so called "covered" microscope slide. In other instances, a vial of blood, serum, or other body fluids may be sent to a laboratory for examination. Such microscope slides and vials should be protected during transmission to the laboratory, not only because they are fragile, but also because the specimens contained thereon or therein can be contaminated or otherwise damaged during handling. This is true regardless of the channels through which the various samples or specimens must pass.

If, for example, a physician is doing a series of diagnostic tests on a patient in a large hospital and has prepared one or more slides at the patient's bedside, the physician, in order to prevent contamination or accidental damage, must either carry such slides or specimens directly to the laboratory, or send them by a nurse or messenger. This procedure is, of course, time consuming and burdensome. Similarly, if the physician is visiting the patient at home, or in an outlying area, which is remote from a biological laboratory, microscope slides and other similar specimens must be carried around by the physician from place to place until he has an opportunity to either bring them or send them to the laboratory for examination. In such instances, the slides or specimens may be damaged or contaminated unless the physician exercises great care in handling and carrying them about.

It is, therefore, a primary object of the present invention to provide a protective container for microscope slides and the like which container is made of a non-frangible or somewhat resilient material capable of absorbing impact.

It is another object of the present invention to provide a multiple purpose container for microscope slides and the like which can be readily used for holding "covered" microscope slides, "uncovered" microscope slides, or specimen vials.

It is a further object of the present invention to provide a device of the type stated having a unitary or self-attached closure so that the container may be quickly closed or opened and, when closed, will hold the contents in a secure and fully protected position.

It is another important object of the present invention to provide a device of the type stated which may be molded by high speed economical production methods from a synthetic resin such as polyethylene, polypropylene or the like.

It is also an object of the present invention to provide a device of the type stated which is of such construction that the entire device, including both the receptacle portion and the closure portion, can be molded as a single unit in a highly economical and efficient manner.

With the above and other objects in view, my invention resides in the novel features of form, construction, arrangement, and combination of parts presently described and pointed out in the claims.

In the accompanying drawing (one sheet):

FIG. 1 is a perspective view of a container constructed in accordance with and embodying the present invention, showing the container in closed position;

FIG. 2 is a perspective view of the container in partially open position;

FIG. 3 is a top plan view of the container;

FIG. 4 is a vertical sectional view taken along lines 4—4 of FIG. 3;

FIG. 5 is a transverse sectional view taken along line 5—5 of FIG. 4;

FIG. 6 is a side elevational view of the container showing the receptacle portion and enclosure portion in the fully opened position in which the container is molded; and FIG. 7 is a fragmentary perspective view illustrating the manner in which the closed container may be opened.

Referring now in more detail and by reference characters to the drawing, which illustrates a preferred embodiment of the present invention, A designates a container or so-called multiple purpose microscope slide-holder comprising a receptacle 1, and a closure 2, unitarily connected by a plurality of integral, flexible, hinge-forming straps 3, 4, and preferably molded from a synthetic resin such as polyethylene, polypropylene or the like in a single molding operation, substantially as shown in FIG. 6.

The receptacle 1 integrally includes a preferably cylindrical side wall 5, integrally connected at its lower margin to a flat bottom wall 6. Around its interior surface the side wall 5 is formed with four equidistantly spaced thickened portions, or so-called lands 7, 8, 9, 10, which have inwardly presented axially extending flat faces $f^1$, $f^2$, $f^3$, $f^4$, respectively. As will be seen by reference to FIGS. 2 and 3, the faces $f^1$, $f^3$, are parallel to each other, and similarly the faces $f^2$, $f^4$, are parallel to each other. Conversely, the faces $f^1$, $f^2$, and the faces $f^3$, $f^4$ are mutually perpendicular. Formed integrally with and projecting interiorly from face $f^1$ are three uniformly spaced axially extending ribs 11, 12, 13, which define two slots 14, 15, and similarly formed on the face $f^3$ are three matching ribs 16, 17, 18, which define two slots 19, 20. At their lower ends, the ribs 11, 12, 13, 16, 17, 18, are co-terminous with the bottom wall 6, and at their upper ends the ribs 11, 12, 13, 16, 17, 18, terminate a short distance below the flat top margins of lands 7, 9 in somewhat arcuate shoulders as best seen in FIGS. 2 and 4.

Similarly formed upon the face $f^2$ are five uniformly spaced axially extending ribs 21, 22, 23, 24, 25, which define axial slots 26, 27, 28, 29, and similarly formed upon the other face $f^{10}$ are five matching ribs 30, 31, 32, 33, 34, which respectively define axial slots 35, 36, 37, 38. Except for number and spacing, the ribs which are formed upon the faces $f^8$, $f^{10}$ are identical with the ribs which are formed on the faces $f^7$, $f^9$.

Formed integrally upon the outer surface of the side wall 5, and projecting more or less radially therefrom, is a flat tab-like ear 39, having a vertical aperture 40. As will be noted by reference to FIGS. 2 and 4, the ear 39 is located a short distance downwardly from the upper margin or mouth of the receptacle 1, and just above the plane of the upper margins of the lands 7, 8, 9, 10. It will also be noted that the ear 39 is located in diametrally opposed relation to and in substantially the same plane as the hinge-forming straps 3, 4, the latter being located equidistantly on opposite sides of and parallel to the diametral line to which the ear 39 is adjacent.

It will be noted by reference to FIG. 6 that the hinge-forming straps 3, 4, in initially molded position, extend outwardly and angularly upwardly from the side wall 5, being integrally connected at their outer ends to the marginal portion of the closure 2, which integrally includes a cylindrical outer wall 41, a flap top wall 42, and an internal concentric annular flange 43. The space between the outer wall 41 and the flange 43 is approximately of the same dimension as the thickness of the upper or lip forming portion of the side wall 5, so that when the closure 2 is swung over and pushed down into closure forming position as shown in FIG. 4, the upper portion of the side wall 5 will be firmly and securely gripped between the outer wall 41 and the annular flange 43. It should be particularly noted that this annular space between the outer wall 41 and the flange 43 has a slight outwardly diverging taper which facilitates a tight fitting engagement between the closure 2 and the upper portion of the side wall 5. Fitted snugly within and retained by the annular flange 43 is a circular pad 44, formed of a soft sponge like material such as foamed polyurethane or the like. This pad 44 is of such axial thickness as to fit snugly against the upper horizontal margins of the microscope slides S, and be slightly indented thereby substantially as shown in FIG. 4. It should be noted in this connection that the actual height of the receptacle 1 is somewhat greater than the standard length of a microscope slide, and the thickness of the pad 44 is such that it will extend far enough down into the receptacle 1, when the closure 2 is in place, to seat itself upon the upper margin of the microscope slides S, in the manner shown. It should also be noted in this connection that the interior surfaces of the receptacle 1 and the interior surfaces of the closure 2 are preferably provided with a slight degree of taper or so-called "draw" to facilitate removal from the mold. As a matter of practical experience, it has been found that an angle of approximately 3° will provide an adequate amount of "draw."

Formed integrally upon and projecting outwardly from the outer wall 41 of the closure 2 is a tab-like ear 45 which is of substantially the same shape as the ear 39, and is provided with a vertical aperture 46. As will be seen by reference to FIG. 3, the apertures 40, 46 are located along the same diametral line so as to be in substantial registration when the closure 2 is in closed position, but, the ears 39, 45 are somewhat offset on opposite sides of this diametral line, so as to be substantially out of line, so to speak. Consequently, the ears 39, 45 will afford laterally projecting flap portions which can be gripped between the thumb and index finger, as shown in FIG. 7 to facilitate lifting the closure 2 upwardly away from closed position. On the other hand, when the closure 2 is in closed position and the apertures 40, 46 are in overlying registration, the container A may be held in closed position by a thin piece of wire or a piece of string which may be threaded through the apertures 40, 46 and twisted or tied. The apertures 40, 46 also serve the additional purpose of providing means by which a shipping tag can be attached to the container A.

As will be seen by reference to FIG. 5, double or overlying pairs of glass plates forming so-called "covered" microscope slides, may be inserted edgewise in the slots 14—19, 15—20, as shown in full lines. Single glass plates or so-called "uncovered" microscope slides may be inserted edgewise in the pairs of slots 26—35, 27—36, 28—37, 29—38, which extend in the other or cross-wise direction as shown in dotted lines.

It is also possible to drop a second circular polyurethane pad 44 into the bottom of the receptacle 1, and insert a vial or specimen bottle therein. The specimen bottle or vial is entirely conventional, and therefore is not shown and specifically described herein, but, it should be noted in this connection that the vertical height of such vial or specimen bottle should be such as to fit more or less snugly between the polyurethane pads 44 in order to be cushioned thereby.

It should be understood that changes and modifications in the form, construction, arrangement, and combination of the several parts of the protective container for holding microscope slides and similar fragile devices may be made and substituted for those herein shown and described without departing from the nature and principle of my invention.

Having thus described my invention, what I claim and desire to secure by Letters Patent is:

1. A protective container unitarily comprising a receptacle having a cylindrical side wall provided on its internal face with a plurality of spaced axial ribs defining elongated slots for gripping opposed parallel edges of microscope slides and supporting them axially within the receptacle, said ribs being arranged in opposed parallel sets, one set being located along one diametral zone of the receptacle and another set being located along a diametral zone at right angles to the first named diametral zone, the inner side faces of the ribs of each set being in parallel relation to one another, hinge-forming means integrally attached at one end to the receptacle, and a closure integrally attached to the other end of the hinge-forming means and being adapted to swing over into enveloping engagement with the upper margin of the receptacle.

2. A protective container unitarily comprising a receptacle having a cylindrical side wall provided on its internal face with a plurality of spaced axial ribs defining elongated slots for gripping opposed parallel edges of microscope slides and supporting them axially within the receptacle, said receptacle having an inward taper of three degrees along its longitudinal axis, said ribs being arranged in sets in such manner that some of the ribs within each set are juxtaposed to other ribs within the same set, one set being located along one diametral zone of the receptacle and another set being located along a diametral zone at right angles to the first named diametral zone, hinge-forming means integrally attached at one end to the receptacle, a closure element having a top wall and a depending concentric flange integrally attached to the other end of the hinge-forming means and being adapted to swing over into enveloping engagement with the upper margin of the receptacle, and a resilient pad disposed within the closure element and retained by said flange, said pad being of such thickness to fit snugly against the upper horizontal margins of said microscope slides and be slightly indented thereby.

3. A protective container unitarily comprising a receptacle having a cylindrical side wall provided around its interior surface with four spaced lands, said lands having inwardly presented axially extending flat faces, each of said faces having a plurality of spaced axial ribs defining elongated slots for gripping opposed parallel edges of microscope slides and supporting them axially within the receptacle, said ribs being arranged in sets in such manner that some of the ribs within each set are juxtaposed to other ribs within the same set, one set being located along one diametral zone of the receptacle and another set being located along a diametral zone which is angularly spaced with respect to the first named diametral zone, the ribs along one diametral zone of the receptacle defining twice the number of elongated slots than the set of ribs located along the diametral zone which is angularly spaced with respect to the first named diametral zone, hinge-forming means integrally attached at one end to the receptacle, and a closure integrally attached to the other end of the hinge-forming means and being adapted to swing over into enveloping engagement with the upper margin of the receptacle.

4. A protective container unitarily comprising a receptacle having a cylindrical side wall provided around its interior surface with four equidistantly spaced lands, said lands having inwardly presented axially extending flat faces, each of said faces having a plurality of spaced axial ribs defining elongated slots for gripping opposed parallel edges of microscope slides and supporting them axially within the receptacle, said ribs being arranged in sets in such manner that some of the ribs within each set are juxtaposed to other ribs within the same set, one set being located along one diametral zone of the receptacle and another set being located along a diametral zone at right angles to the first named diametral zone, the ribs along one diametral zone of the receptacle defining twice the number of elongated slots than the set of ribs located along the diametral zone at right angles to the first named diametral zone, hinge-forming means integrally attached at one end to the receptacle, and a closure integrally attached to the other end of the hinge-forming means and being adapted to swing over into enveloping engagement with the upper margin of the receptacle.

References Cited in the file of this patent

UNITED STATES PATENTS

| | | |
|---|---|---|
| 888,855 | Sisco | May 26, 1908 |
| 2,690,947 | Roehrel | Oct. 5, 1954 |
| 2,852,054 | Motley | Sept. 16, 1958 |
| 2,937,745 | Wilson | May 24, 1960 |
| 2,992,501 | Douglas | July 18, 1961 |
| 2,998,127 | Stewart | Aug. 29, 1961 |
| 3,005,564 | Weichselbaum | Oct. 24, 1961 |
| 3,010,570 | Sundstrom | Nov. 28, 1961 |

FOREIGN PATENTS

| | | |
|---|---|---|
| 671,129 | Great Britain | Apr. 30, 1952 |